United States Patent
Richards et al.

(10) Patent No.: US 10,598,942 B1
(45) Date of Patent: Mar. 24, 2020

(54) MOUNTING ASSEMBLY WITH REWORKABLE ACTIVE ALIGNMENT

(71) Applicant: Facebook Technologies, LLC, Menlo Park, CA (US)

(72) Inventors: Evan M. Richards, Santa Clara, CA (US); Shie Ping Jeffrey Tseng, Los Altos, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/153,437

(22) Filed: Oct. 5, 2018

(51) Int. Cl.
*G02B 27/01* (2006.01)

(52) U.S. Cl.
CPC ..... *G02B 27/0176* (2013.01); *G02B 27/0172* (2013.01); *G02B 2027/011* (2013.01); *G02B 2027/014* (2013.01); *G02B 2027/015* (2013.01); *G02B 2027/0138* (2013.01); *G02B 2027/0152* (2013.01); *G02B 2027/0154* (2013.01); *G02B 2027/0169* (2013.01)

(58) Field of Classification Search
CPC ............ G02B 27/0176; G02B 27/0172; G02B 2027/011; G02B 2027/0138; G02B 2027/014; G02B 2027/015; G02B 2027/152; G02B 2027/0154; G02B 2027/0169
See application file for complete search history.

(56) References Cited

U.S. PATENT DOCUMENTS

| | | | | |
|---|---|---|---|---|
| 9,472,025 | B2 * | 10/2016 | Thomas | G06T 19/006 |
| 10,074,700 | B2 * | 9/2018 | Nakamura | H01L 27/322 |
| 10,331,208 | B2 * | 6/2019 | Kim | G02B 27/0093 |
| 10,386,891 | B2 * | 8/2019 | Allen | G06F 1/1626 |
| 2007/0237491 | A1 * | 10/2007 | Kraft | G02B 27/017 386/230 |
| 2010/0079356 | A1 * | 4/2010 | Hoellwarth | G02B 27/017 345/8 |
| 2012/0212499 | A1 * | 8/2012 | Haddick | G02B 27/0093 345/589 |
| 2013/0127980 | A1 * | 5/2013 | Haddick | G06F 3/013 348/14.08 |
| 2014/0266990 | A1 * | 9/2014 | Makino | G02B 27/017 345/8 |
| 2016/0011424 | A1 * | 1/2016 | Thurber | G02B 27/64 345/8 |
| 2016/0268551 | A1 * | 9/2016 | Shen | H01L 51/5271 |
| 2016/0341953 | A1 * | 11/2016 | Tseng | G02B 27/0176 |
| 2017/0031165 | A1 * | 2/2017 | Costa | G02B 27/028 |
| 2017/0318281 | A1 * | 11/2017 | Edlund | G02B 27/0172 |
| 2018/0101013 | A1 * | 4/2018 | Moore | G03H 1/2645 |
| 2018/0188779 | A1 * | 7/2018 | Allen | G01C 9/00 |
| 2018/0267320 | A1 * | 9/2018 | Chen | G02B 27/0176 |
| 2019/0246091 | A1 * | 8/2019 | Bikumandla | G02B 27/4205 |

\* cited by examiner

*Primary Examiner* — Kenneth Bukowski
(74) *Attorney, Agent, or Firm* — Fenwick & West LLP

(57) ABSTRACT

A mounting assembly for optical elements in a head-mounted display. The mounting assembly includes a housing and an element retainer. The housing encloses an optical element. The element retainer includes a first surface and a second surface. The first surface is fixed to the optical element via a first adhesive element. The second surface is fixed to the housing via a second adhesive element.

20 Claims, 5 Drawing Sheets

US 10,598,942 B1

MOUNTING ASSEMBLY WITH REWORKABLE ACTIVE ALIGNMENT

BACKGROUND

This disclosure relates generally to a mounting assembly for a head-mounted display (HMD), and specifically relates to a mounting assembly with a reworkable active alignment.

In conventional configurations, a HMD includes a mounting assembly where one or more optical elements of an optical assembly are fixed to a housing via one or more adhesive elements. However, in the conventional configurations, it is not possible to remove the one or more optical elements from the housing (e.g., for replacement with some other optical element) without damaging the optical assembly and the HMD. If the optical assembly is damaged, a replacement optical assembly is needed, which is costly relative to the cost of the HMD. In addition, in the conventional configurations, there is no flexibility for re-aligning the one or more optical elements with a display element of the HMD once the HMD is manufactured.

SUMMARY

Embodiments of the present disclosure relate to a mounting assembly including a housing and an element retainer. The housing encloses an optical element. The element retainer includes a first surface and a second surface. The first surface is fixed to the optical element via a first adhesive element. The second surface is fixed to the housing via a second adhesive element.

The mounting assembly may be part of a head-mounted display (HMD). The HMD further includes a display element and an optical assembly. The display element is configured to emit image light. The optical assembly includes the optical element that directs the image light to an eye box of a user's eye. The element retainer is coupled to the optical element and to the housing that may be part of a front rigid body of the HMD. The optical element is fixed to the element retainer via the first adhesive element. The element retainer is fixed to the housing via the second adhesive element.

In some embodiments a method for providing a reworkable active alignment mounting is described herein. The method includes fixing the optical retainer to a housing (or a front rigid body) of a HMD via the first adhesive element. The method further includes fixing the optical element to the element retainer via the second adhesive element, wherein the element retainer is positioned between the housing and the optical element.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye display (NED), a mobile device or computing system, or any other hardware platform capable of providing artificial reality content to one or more viewers.

A mounting assembly for optical elements is presented herein that provides reworkable active alignment. The mounting assembly can be part of a HMD. The HMD displays content to a user. The HMD may be part of an artificial reality system. The mounting assembly includes a housing and one or more element retainers. An element retainer is coupled to one or more optical elements (e.g., a lens) and is also coupled to the housing. The housing may be part of a front rigid body of the HMD. The housing couples to a display housing that holds a display element of the HMD. The optical element is fixed to the element retainer via a first adhesive element whose adhesive force varies with a shear direction, which facilitates removal of the optical element. The element retainer is fixed to the housing via a second adhesive element. Additionally, certain features (e.g., datums) may be placed on the element retainers. In some embodiments, the optical elements form a pancake lens assembly.

Figure 1:
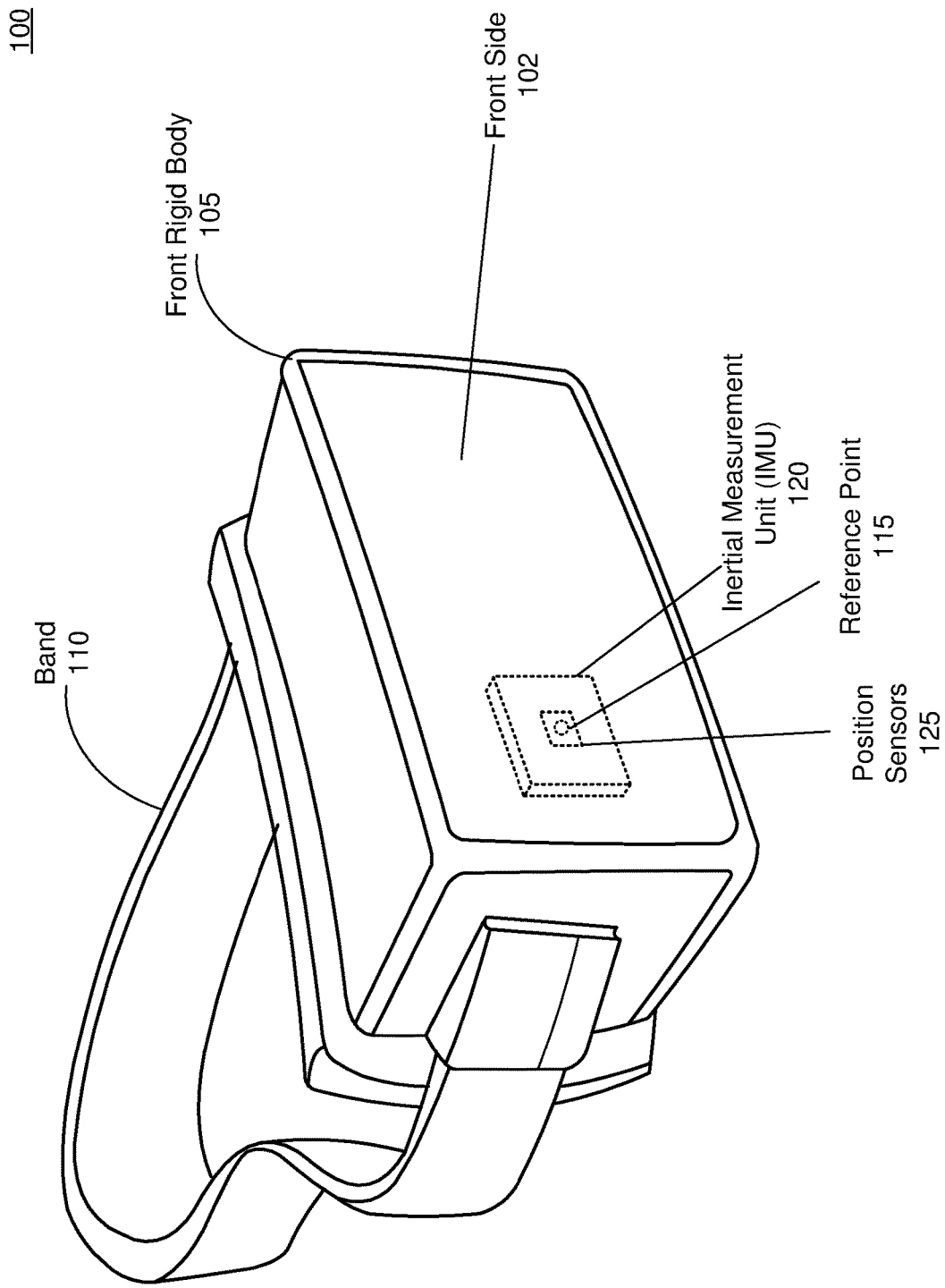
FIG. 1 is a diagram of a head-mounted display (HMD), in accordance with one or more embodiments.

FIG. 1 is a diagram of a HMD 100, in accordance with one or more embodiments. The HMD 100 may be part of an artificial reality system. In embodiments that describe an AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). In some embodiments, portions of the HMD 100 that are at least partial transparent include one or more other parts of the HMD 100, e.g., a top portion of the HMD 100, a side portion of the HMD 100, a bottom portion of the HMD 100, etc. The HMD 100 includes a front rigid body 105, a band 110, and a reference point 115.

The front rigid body 105 includes one or more display elements (not shown in FIG. 1), an Inertial Measurement Unit (IMU) 120, one or more position sensors 125, and the reference point 115. In the embodiment shown by FIG. 1, the position sensors 125 are located within the IMU 120, and neither the IMU 120 nor the position sensors 125 are visible to a user of the HMD 100. The IMU 120 is an electronic device that generates IMU data based on measurement signals received from the position sensors 125. A position sensor 125 generates one or more measurement signals in response to motion of the HMD 100. Examples of position sensors 125 include: one or more accelerometers, one or more gyroscopes, one or more magnetometers, another suitable type of sensor that detects motion, a type of sensor used for error correction of the IMU 120, or some combination thereof. The position sensors 125 may be located external to the IMU 120, internal to the IMU 120, or some combination thereof.

The reference point 115 is a point that may be used to describe the position of the HMD 100. While the reference point 115 may generally be defined as a point in space; however, in practice the reference point 115 is defined as a point within the HMD 100 (e.g., a center of the IMU 120). Note that the illustrated positions of the position sensors 125, the reference point 115 and the IMU 120 on the front side of the HMD 100 are just an example, and these elements can be placed anywhere on the HMD 100.

Figure 2A:
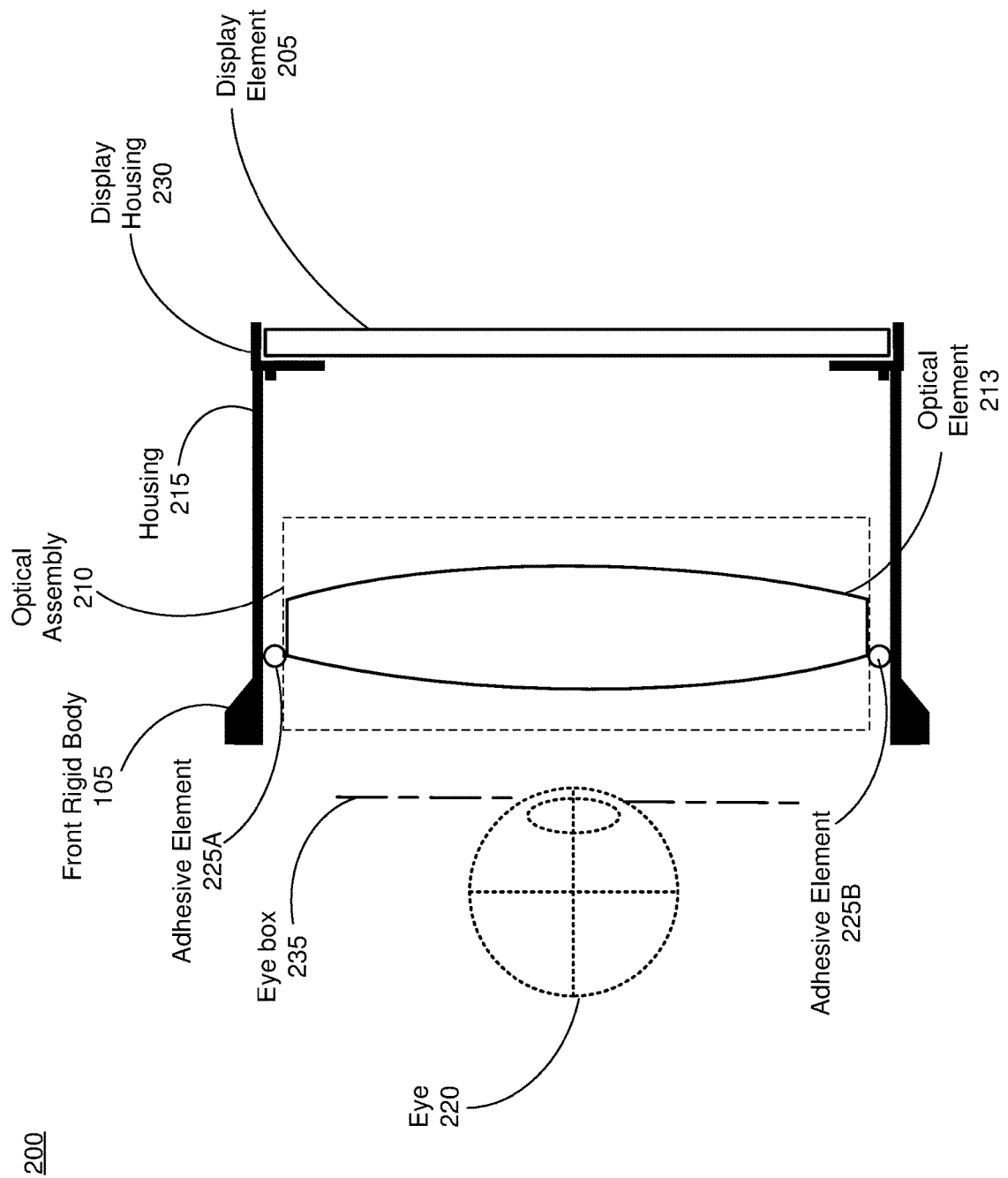
FIG. 2A is a cross section of a front rigid body of the HMD in FIG. 1 including one or more optical elements fixed to a housing, in accordance with one or more embodiments.

FIG. 2A is a cross-section 200 of the front rigid body 105 of the HMD 100 in FIG. 1, in accordance with one or more embodiments. The front rigid body 105 illustrated in FIG. 2A includes, among other components, a display element 205, an optical assembly 210, a housing 215, adhesive elements 225A-225B, and a display housing 230. Although FIG. 2A depicts a center cross-section of an eye 220, the center cross-section of the eye 220 does not have to be in the same place. An additional display element 205 and optical assembly 210, separate from those shown in FIG. 2A, may be included in the front rigid body 105 to present content to another eye of the user.

The display element 205 generates image light. In some embodiments, the display element 205 includes an optical element that adjusts the focus of the generated image light. The display element 205 displays images to the user in accordance with data received from a console (not shown in FIG. 2A). In various embodiments, the display element 205 may comprise a single electronic display element or multiple electronic displays elements (e.g., a display element for each eye of a user). Examples of the display element 205 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, a waveguide display, some other display, or some combination thereof. The display element 205 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the display element 205. In some embodiments, the display element 205 may have one or more coatings, such as anti-reflective coatings.

The optical assembly 210 magnifies received image light from the display element 205, corrects optical errors associated with the image light, and presents the corrected image light to a user of the HMD 100. The optical assembly 210 directs the magnified and/or corrected image light to an eye box 235 of the eye 220 for presentation to a user wearing the HMD 100. The eye box 235 is a location in space that would be occupied by the eye 220. The optical assembly 210 includes an optical element 213. Although not shown in FIG. 2A, the optical assembly 210 may include one or more other optical elements in addition to the optical element 213. In some embodiments, the optical assembly 210 includes multiple optical elements that form a pancake lens assembly. In some other embodiments, the optical assembly 210 includes multiple non-pancake type lenses (e.g., singlets, multi-element optical systems with high sensitivity, etc.). The optical element 213 may be an aperture, a Fresnel lens, a refractive lens, a reflective surface, a diffractive element, a waveguide, a filter, or any other suitable optical element that affects the image light emitted from the display element 205. Moreover, the optical assembly 210 may include combinations of different optical elements. In some embodiments, one or more optical elements in the optical assembly 210 may have one or more coatings, such as anti-reflective coatings, dichroic coatings, etc.

Magnification of the image light by the optical assembly 210 allows the display element 205 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optical assembly 210 is designed so its effective focal length is larger than the spacing to the display element 205, which magnifies the image light projected by the display element 205.

In some embodiments, the optical assembly 210 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided by the display element 205 is pre-distorted such that it offsets some distortion caused by the optical assembly 210.

As shown in FIG. 2A, the optical element 213 is fixed to the housing 215 via adhesive elements 225A, 225B. In embodiments where the optical assembly 210 include one or more additional optical elements (not shown in FIG. 2A), each of the one or more optical elements may be fixed to both sides of the housing 215 via a specific pair of adhesive elements. Note that the housing 215 may correspond to at least a portion of the front rigid body 105 of the HMD 100 in FIG. 1. As shown in FIG. 2A, one side of the optical element 213 is fixed to one side of the housing 215 via the adhesive element 225A, and another side of the optical element 213 is fixed to another side of the housing 215 via the adhesive element 225B.

In some embodiments, each of the adhesive elements 225A, 225B is implemented as a pressure-sensitive adhesive element. A pressure-sensitive adhesive element is an adhesive that forms a bond with an adjacent surface when the pressure is applied on the adhesive element. Note that no solvent, water, or heat is required to activate the pressure-sensitive adhesive element. An adhesive force of each of the adhesive elements 225A, 225B may be influenced by the amount of pressure used to apply the adhesive to surfaces of the optical element 213 and the housing 215, and also by surface factors such as smoothness, an amount of contaminants, etc. The adhesive elements 225A, 225B may be designed to form a bond and hold properly at room temperatures. Additionally or alternatively, the adhesive elements 225A, 225B may be designed to retain their shear holding ability at high or low temperatures.

In some embodiments, at least one of the adhesive elements 225A, 225B is implemented as an optical component compatible adhesive element. An optical component compatible adhesive element can bond to glass or polymer without damaging the part. The optical component compatible adhesive element may be implemented as, e.g., a liquid optical component compatible adhesive or non-liquid optical component compatible adhesive tape. Note that optical component compatible adhesive is a bonding technology used in a wide range of electronic equipment to bind optical elements to each other or to a housing. In some embodiments (not shown in FIG. 2A), optical component compatible adhesive is used to bind one or more optical elements to form the optical assembly 210. In some other embodiments (shown in FIG. 2A), optical component compatible adhesive elements 225A, 225B are used to bind the optical element 213 to the housing 215. After application, the optical component compatible adhesive elements 225A, 225B may be cured through ultraviolet light (UV), heat, moisture, some other curing technique, or some combination thereof.

As shown in FIG. 2A, the front rigid body 105 of the HMD 100 may include the housing 215 and the display housing 230. The housing 215 may be a rigid casing that encloses and protects at least a portion of the optical assembly 210. The housing 215 couples to the display housing 230. The display housing 230 partially encloses and holds the display element 205. In some embodiments, the housing 215 and the display housing 230 are composed of the same material. Alternatively, the housing 215 and the display housing 230 are composed of different materials. In some embodiments, the housing 215 and the display housing 230 have the same thickness. Alternatively, the housing 215 and the display housing 230 have different thickness. Light from the display element 205 passes through the optical assembly 210 within the housing 215. The housing 215 may include a first side and a second side displaced by a distance and in parallel to the first side. The distance between the first side and the second side of the housing 215 is at least the length of the display element 205. A portion of the display housing 230 may be perpendicular to the housing 215. In some embodiments, the housing 215, the display housing 230, and the display element 205 form a three-sided rectangular area of the front rigid body 105 of the HMD 100.

In some embodiments, the front rigid body 105 further comprises an eye tracking system (not shown in FIG. 2A) that determines eye tracking information for the user's eye 220. The determined eye tracking information may comprise information about an orientation of the user's eye 220 in the eye box 235, i.e., information about an angle of an eye-gaze. In one embodiment, the user's eye 220 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 105 further includes a varifocal module (not shown in FIG. 2A). The varifocal module may adjust focus of one or more images displayed on the display element 205, e.g., based on the eye tracking information obtained from the eye tracking system. In one embodiment, the varifocal module adjusts focus of the displayed images and mitigates vergence-accommodation conflict by adjusting a focal distance of the optical assembly 210 based on the determined eye tracking information. In another embodiment, the varifocal module adjusts focus of the displayed images by performing foveated rendering of the one or more images based on the determined eye tracking information. In yet another embodiment, the varifocal module utilizes depth information (e.g., obtained from a depth camera assembly of the HMD 100 of FIG. 1) to generate content for presentation on the display element 205.

Figure 2B:
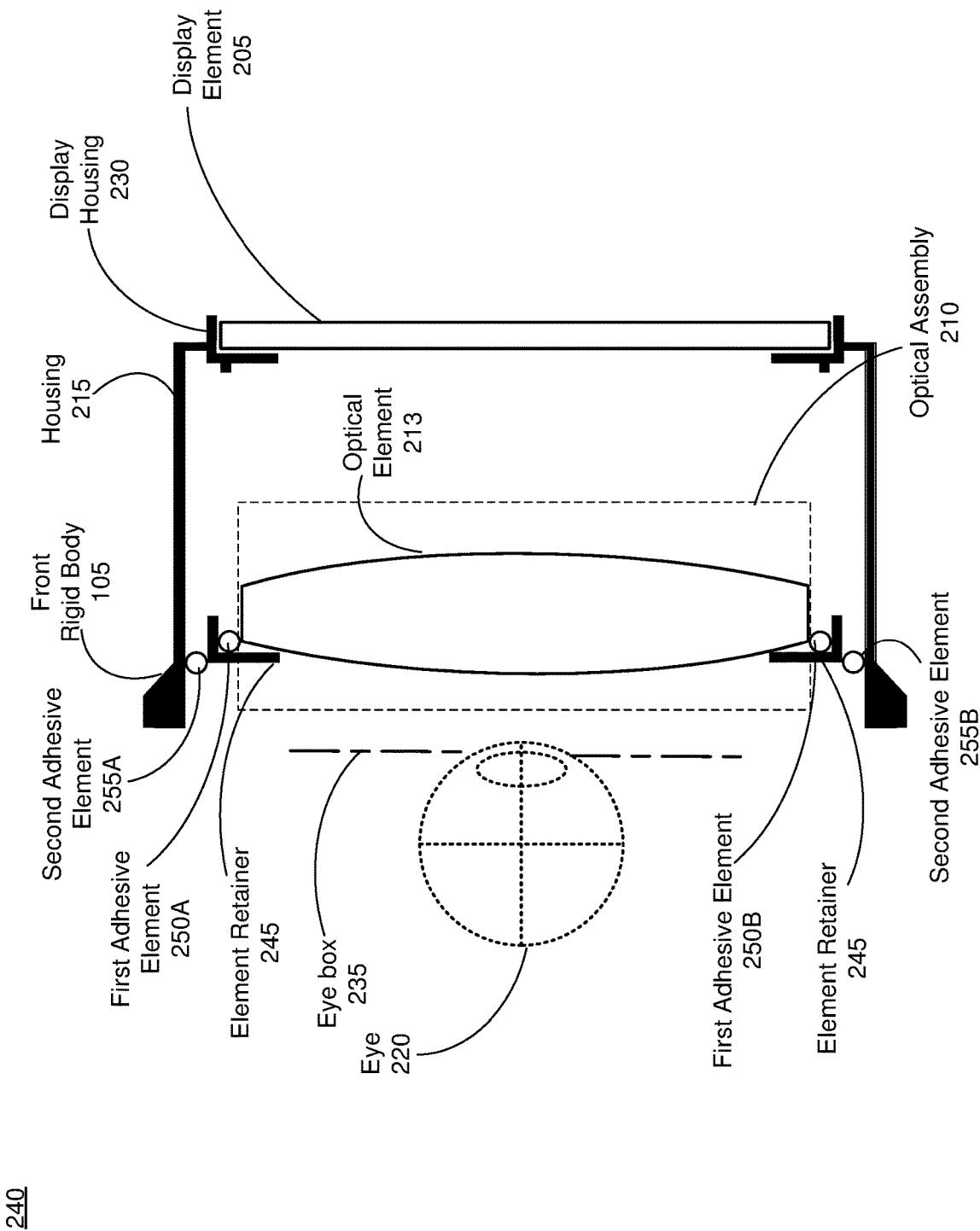
FIG. 2B is a cross section of a front rigid body of the HMD in FIG. 1 including a mounting assembly with a reworkable active alignment, in accordance with one or more embodiments.

FIG. 2B is another cross-section 240 of the front rigid body 105 of the HMD 100 in FIG. 1, which includes a mounting assembly with reworkable active alignment, in accordance with one or more embodiments. The mounting assembly is configured to mount optical elements and provide reworkable active alignment. The mounting assembly may be part of the HMD 100. The mounting assembly includes the housing 215 and an element retainer 245. The front rigid body 105 in FIG. 2B includes, among other components, the display element 205, the optical assembly 210 with the optical element 213, the housing 215, the display housing 230, the element retainer 245, first adhesive elements 250A-250B, and second adhesive elements 255A-255B. Although FIG. 2B depicts a center cross-section of the eye 220, the center cross-section of the eye 220 does not have to be in the same place. An additional display element 205 and optical assembly 210, separate from those shown in FIG. 2B, may be included in the front rigid body 105 to present content to another eye of the user. The display element 205, the optical assembly 210, the housing 215, and the display housing 230 are described in detail above with reference to FIG. 2A.

FIG. 2B illustrates an embodiment where the optical assembly 210 includes a single optical element 213. In some other embodiments (not shown in FIG. 2B), the optical assembly 210 may include a plurality of optical elements. In one or more embodiments, the plurality of optical elements of the optical assembly 210 may form a pancake lens assembly. The optical element 213 may be of an oval shape. In some embodiments, the optical element 213 is rotationally symmetric about an optical axis.

The element retainer 245 partially encloses the optical element 213 on at least three sides. The element retainer 245 is coupled to both the optical element 213 and to the housing 215. In the embodiment of FIG. 2B, the element retainer 245 is of a rectangular shape, but the present disclosure is not limited thereto. The element retainer 245 may be shaped to match an outer region of the optical element 213. FIG. 2B shows a single element retainer 245, but the present disclosure is not limited thereto. In some embodiments, the HMD 100 includes a plurality of element retainers, wherein each element retainer is coupled to a different optical element of the optical assembly 210 and to the housing 215 (not shown in FIG. 2B). Alternatively, each element retainer may be coupled to two or more optical elements of the optical assembly 210 (not shown in FIG. 2B). The element retainer 245, the housing 215, and the display housing 230 may be composed of metal (e.g., aluminum, magnesium, titanium, etc.), thermoplastics (e.g., acrylonitrile-butadiene-styrene (ABS), polycarbonate acrylonitrile-butadiene-styrene (PC-ABS), acetal, acrylic, polycarbonate, etc.), other materials, or combination thereof, depending on application requirements and compatibility with the first adhesive elements 250A, 250B and the second adhesive elements 255A, 255B. Note that rigidity of the element retainer 245, the housing 215, and the display housing 230 to maintain their respective structures and forms allows maintaining a defined spacing between the optical assembly 210 and the display element 205.

In some embodiments, the element retainer 245 is made of discrete instances (e.g., at least two). The discrete element retainer 245 may have at least three bonding points for bonding with the optical element 213. In some other embodiments, the element retainer 245 is a continuous element that wraps the optical element 213. The continuous element retainer 245 may be bonded to the optical element 213 along the entire perimeter. Alternatively, the continuous element retainer 245 may be bonded to the optical element 213 at discrete locations. In some embodiments, one or more features (e.g., datums) are placed on the element retainer 245. The one or more features may be used, for example, to determine a distance between the optical element 213 and the display element 205. The element retainer 245 may be aligned to the housing 215 and/or the display element 205 using the one or more datums. Additionally, in some embodiments, the housing 215 may include locations to place on the element retainer 245 such that once fixed, the element retainer 245 is aligned with the housing 215 and/or the display element 205.

The first adhesive elements 250A, 250B are configured to fix two sides of the optical element 213 to two different portions (e.g., discrete instances) of the element retainer 245. In some embodiments (not shown in FIG. 2B), at least one other portion (or discrete instance) of the element retainer 245 may be bonded to the optical element 213 (e.g., discrete instances of the element retainer 245 can be spaced out at 120 degree intervals). As shown in FIG. 2B, one side of the optical element 213 is coupled to one portion of the element retainer 245 via the first adhesive element 250A, and another side of the optical element 213 is coupled to another portion of the element retainer 245 via the first adhesive element 250B. The first adhesive elements 250A, 250B may be the same as the adhesive elements 225A, 225B in FIG. 2A. In some embodiments, at least one of the first adhesive elements 250A, 250B is a pressure-sensitive adhesive element. In some other embodiments, at least one of the first adhesive elements 250A, 250B is an optical component compatible adhesive element. The adhesive force of each of the first adhesive elements 250A, 250B may vary with a direction of a shear force.

The second adhesive elements 255A, 255B are configured to fix both portions of the element retainer 245 to the housing 215. As shown in FIG. 2B, one portion of the element retainer 245 is coupled to the housing 215 via the second adhesive element 255A, and another portion of the element retainer 245 is coupled to the housing 215 via the second adhesive element 255B. After application, the second adhesive elements 255A, 255B may be cured by applying UV light, heat, moisture, some other curing technique, or some combination thereof, in order to fix the element retainer 245 to the housing 245. In some embodiments, each of the second adhesive elements 255A, 255B is a pressure-sensitive adhesive. The adhesive force of each of the second adhesive elements 255A, 255B may vary with a direction of a shear force. Note that instead of fixing the optical element 213 directly to the housing 215 as in FIG. 2A, the element retainer 245 is fixed to the housing 215 via the second adhesive elements 255A, 255B, whereas the optical element 213 is coupled to the element retainer 245 via the first adhesive elements 250A, 250B. In this way, it is possible to remove the optical element 213 from the element retainer 245 without damaging the optical assembly 210 and the HMD 100. In some embodiments, the optical element 213 is aligned as the element retainer 245 and the housing 215 are fixed in place. For example, the optical element 213 may be aligned relative to the display element 205 and bonded at the aligned position.

The configuration shown in FIG. 2B also allows active alignment of the optical element 213 relative to the display element 205, as the optical element 213 is not fixed to the housing 215. For performing the active alignment, the front rigid body 105 interfaces with an imaging device and an actuator (both not shown in FIG. 2B). The imaging device may be displaced in front of the optical element 213 and configured to image one or more features on the display element 205. Additionally or alternatively, the imaging device is configured to image one or more features on the element retainer 245. The actuator may be configured to align the optical element 213 relative to the display element 205 based on the one or more imaged features. In some embodiments, a distance between the optical element 213 and the display element 205 is adjustable. The actuator may be further configured to adjust the distance based on the one or more imaged features. In some embodiments, the actuator adjusts the distance between the optical element 213 and the display element 205 based on a feedback signal (e.g., provided to the actuator by the imaging device) prior to bonding the optical element 213 and the display element 205 to the housing 215 via the element retainer 245 and the display housing 230, respectively.

Figure 3:
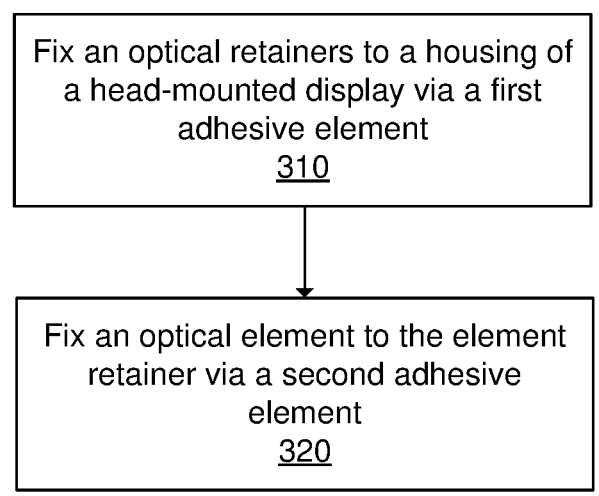
FIG. 3 is a flow chart illustrating a process for active alignment mounting of one or more optical elements of the HMD in FIG. 1, in accordance with one or more embodiments.

FIG. 3 is a flow chart illustrating a process 300 for active alignment mounting of one or more optical elements of a HMD, in accordance with one or more embodiments. The process 300 of FIG. 3 may include different and/or additional steps, or perform the steps in different orders.

An element retainer is fixed 310 to a housing of a HMD via a first adhesive element. In some embodiments the first adhesive elements is a pressure-sensitive adhesive. The element retainer may be aligned to the housing and/or a display element of the HMD using one or more datums on the element retainer. Additionally, in some embodiments, the housing may include locations to place on the element retainer such that once fixed, the element retainer is aligned with the housing and/or the display element.

An optical element is fixed 320 to the element retainer via a second adhesive element. The element retainer may be positioned between the housing and the optical element. In some embodiments, the second adhesive element is selected from the group consisting of a pressure-sensitive adhesive element and an optical component compatible adhesive element. In some embodiments, position of the optical element relative to the display element can be adjusted via the second adhesive elements. The display element is held by a display housing coupled to the housing. The optical element may be aligned as the element retainer and the housing are fixed in place. For example, the optical element may be aligned relative to the display element and bonded at the aligned position.

In some embodiments, after the optical element is fixed 320 to the element retainer via the second adhesive element, a mounting assembly that includes the housing and the element retainer for mounting the optical element undergoes validation testing. If the mounting assembly passes the validation testing, the mounting assembly is accepted and the process 300 may proceed to production and integration of the mounting assembly into HMDs. Otherwise, if the mounting assembly fails the validation testing, components of the mounting assembly are disassembled, and the process 300 repeats by returning back to step 310.

System Environment

Figure 4:
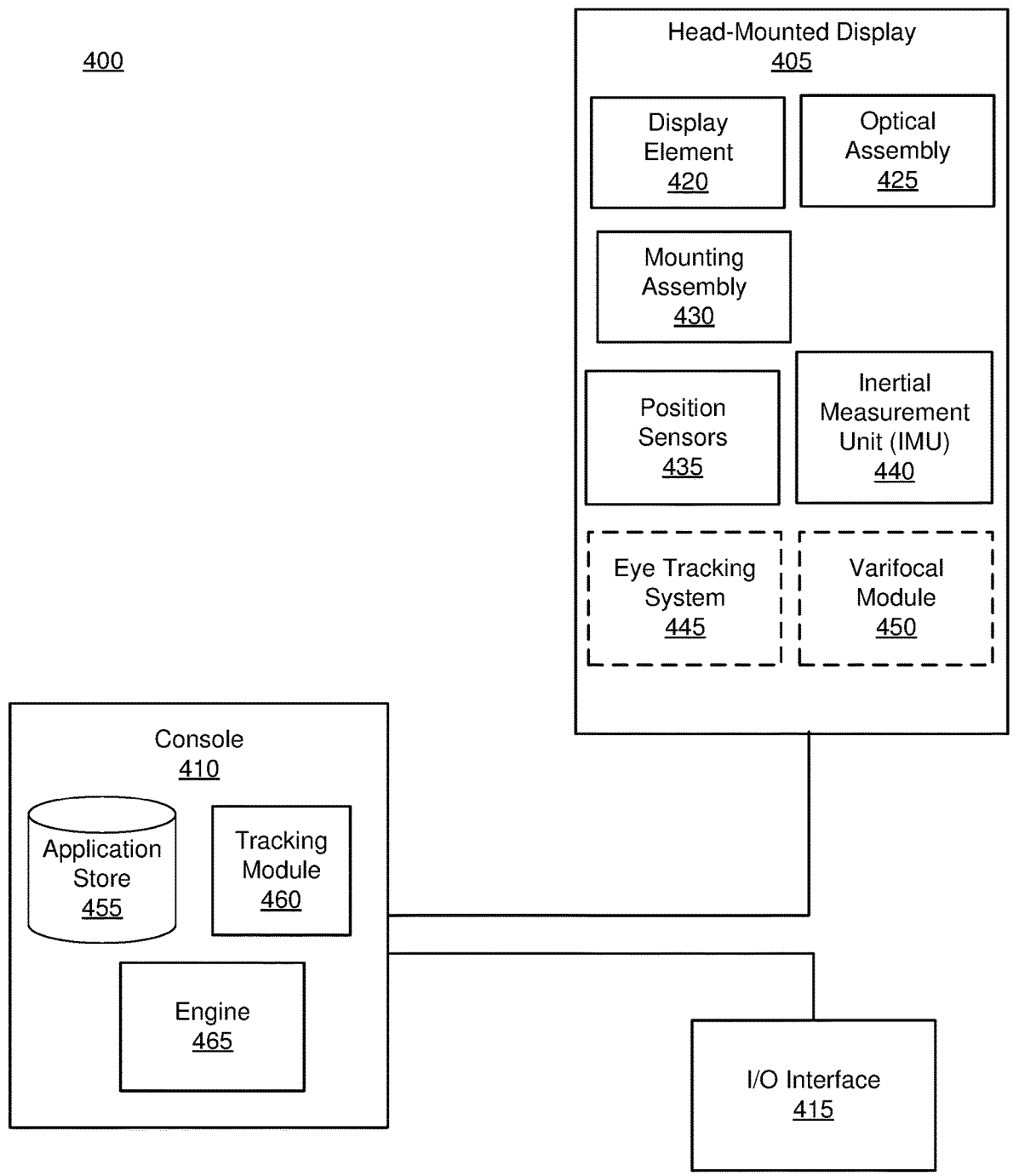
FIG. 4 is a block diagram of an HMD system in which a console operates, in accordance with one or more embodiments.

FIG. 4 is a block diagram of one embodiment of a HMD system 400 in which a console 410 operates, in accordance with one or more embodiments. The HMD system 400 may operate as an artificial reality system. The HMD system 400 includes an HMD 405 and an input/output (I/O) interface 415, which are each coupled to the console 410. While FIG. 4 shows an example HMD system 400 including one HMD 405 and one I/O interface 415, in other embodiments, any number of these components may be included in the HMD system 400. For example, there may be multiple HMDs 400, each having an associated I/O interface 415, with each HMD 405 and I/O interface 415 communicating with the console 410. In other embodiments, different and/or additional components may also be included in the HMD system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the HMD 405.

The HMD 405 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 405, the console 410, or both, and presents audio data based on the audio information.

The HMD 405 includes a display element 420, an optical assembly 425, a mounting assembly 430, one or more position sensors 435, an IMU 440, an optional eye tracking system 445, and an optional varifocal module 450. Some embodiments of the HMD 405 have different components than those described in conjunction with FIG. 4. Additionally, the functionality provided by various components described in conjunction with FIG. 4 may be differently distributed among the components of the HMD 405 in other embodiments.

The display element 420 displays two-dimensional or three-dimensional images to the user in accordance with data received from the console 410. In various embodiments, the display element 420 comprises a single display or multiple displays (e.g., a display for each eye of a user). Examples of the electronic display 420 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. An embodiment of the display element 420 is the display element 205 of FIGS. 2A-2B.

In some embodiments, the optical assembly 425 magnifies image light received from the display element 420 and/or corrects optical errors associated with the image light, and presents the corrected image light to a user of the HMD 405. The optical assembly 425 includes one or more optical elements. Example optical elements included in the optical assembly 425 include: an aperture, a Fresnel lens, a positive lens, a negative lens, a filter, a reflecting surface, or any other suitable optical element that affects image light. Moreover, the optical assembly 425 may include combinations of different optical elements. In some embodiments, one or more optical elements in the optical assembly 425 may have one or more coatings, such as partially reflective or anti-reflective coatings.

Magnification and focusing of the image light by the optical assembly 425 allows the display element 420 to be physically smaller, weigh less and consume less power than larger displays. Additionally, magnification may increase the field-of-view of the content presented by the display element 420. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 425 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display element 420 for display is pre-distorted, and the optical assembly 425 corrects the distortion when it receives image light from the display element 420 generated based on the content. An embodiment of the optical assembly 425 is the optical assembly 210 of FIGS. 2A-2B.

The mounting assembly 430 includes a housing that encloses an optical element (of the optical assembly 425) and an element retainer. The element retainer includes a first surface and a second surface. The first surface is fixed to the optical element via a first adhesive element. The second surface is fixed to the housing via a second adhesive element.

The IMU 440 is an electronic device that generates data indicating a position of the HMD 405 based on measurement signals received from one or more of the position sensors 435. A position sensor 435 generates one or more measurement signals in response to motion of the HMD 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the HMD 405 relative to an initial position of the HMD 405. For example, the position sensors 435 include multiple accelerometers to measure translational motion (forward/back, up/down, left/right) and multiple gyroscopes to measure rotational motion (e.g., pitch, yaw, roll). An embodiment of the position sensor 435 is the position sensor 125 of FIG. 1. In some embodiments, the IMU 440 rapidly samples the measurement signals and calculates the estimated current position of the HMD 405 from the sampled data. For example, the IMU 440 integrates the measurement signals received from the accelerometers over time to estimate a velocity vector and integrates the velocity vector over time to determine an estimated current position of a reference point on the HMD 405. Alternatively, the IMU 440 provides the sampled measurement signals to the console 420, which interprets the data to reduce error. The reference point is a point that may be used to describe the position of the HMD 405. The reference point may generally be defined as a point in space or a position related to the HMD's 405 orientation and position. An embodiment of the IMU 440 is the IMU 120 of FIG. 1.

In some embodiments, the eye tracking system 445 is integrated into the HMD 405. The eye tracking system 445 determines eye tracking information associated with an eye of a user wearing the HMD 405. The eye tracking information determined by the eye tracking system 445 may comprise information about an orientation of the user's eye, i.e., information about an angle of an eye-gaze. In some embodiments, the eye tracking system 445 is integrated into the optical assembly 430. An embodiment of the eye-tracking system 445 may comprise an illumination source and an imaging device (camera).

In some embodiments, the varifocal module 450 is further integrated into the HMD 405. The varifocal module 450 may be coupled to the eye tracking system 445 to obtain eye tracking information determined by the eye tracking system 445. The varifocal module 450 may be configured to adjust focus of one or more images displayed on the display element 420, based on the determined eye tracking information obtained from the eye tracking system 445. In this way, the varifocal module 450 can mitigate vergence-accommodation conflict in relation to image light. The varifocal module 450 can be interfaced (e.g., either mechanically or electrically) with at least one of the display element 420 and at least one optical element of the optical assembly 425. Then, the varifocal module 450 may be configured to adjust focus of the one or more images displayed on the display element 420 by adjusting position of at least one of the display element 420 and the at least one optical element of the optical assembly 425, based on the determined eye tracking information obtained from the eye tracking system 445. By adjusting the position, the varifocal module 450 varies focus of image light output from the display element 420 towards the user's eye. The varifocal module 450 may be also configured to adjust resolution of the images displayed on the display element 420 by performing foveated rendering of the displayed images, based at least in part on the determined eye tracking information obtained from the eye tracking system 445. In this case, the varifocal module 450 provides appropriate image signals to the display element 420. The varifocal module 450 provides image signals with a maximum pixel density for the display element 420 only in a foveal region of the user's eye-gaze, while providing image signals with lower pixel densities in other regions of the display element 420. In one or more embodiments, the varifocal module 450 adjusts an optical power of a corrective optical element included into the HMD 405 to offset an optical power added by, e.g., the optical assembly 425 to light from the local area.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures IMU data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the HMD 405 for processing in accordance with information received from one or more of: the HMD 405, and the I/O interface 415. In the example shown in FIG. 4, the console 410 includes an application store 455, a tracking module 460, and an engine 465. Some embodiments of the console 410 have different modules or components than those described in conjunction with FIG. 4. Similarly, the functions further described below may be distributed among components of the console 410 in a different manner than described in conjunction with FIG. 4.

The application store 455 stores one or more applications for execution by the console 410. An application is a group of instructions, that when executed by a processor, generates content for presentation to the user. Content generated by an application may be in response to inputs received from the user via movement of the HMD 405 or the I/O interface 415. Examples of applications include: gaming applications, conferencing applications, video playback applications, or other suitable applications.

The tracking module 460 calibrates the HMD system 400 using one or more calibration parameters and may adjust one or more calibration parameters to reduce error in determination of the position of the HMD 405 or of the I/O interface 415. For example, the tracking module 460 communicates a calibration parameter to the HMD 405. Calibration performed by the tracking module 460 also accounts for information received from the IMU 440 in the HMD 405 and/or an IMU 440 included in the I/O interface 415. Additionally, if tracking of the HMD 405 is lost (e.g., the HMD 405 loses line of sight of at least a threshold number of light elements), the tracking module 460 may re-calibrate some or all of the HMD system 400.

The tracking module 460 tracks movements of the HMD 405 or of the I/O interface 415 using information from the one or more position sensors 435, the IMU 440 or some combination thereof. For example, the tracking module 450 determines a position of a reference point of the HMD 405 in a mapping of a local area based on information from the HMD 405. The tracking module 460 may also determine positions of the reference point of the HMD 405 or a reference point of the I/O interface 415 using data indicating a position of the HMD 405 from the IMU 440 or using data indicating a position of the I/O interface 415 from an IMU 440 included in the I/O interface 415, respectively. Additionally, in some embodiments, the tracking module 460 may use portions of data indicating a position or the HMD 405 from the IMU 440 to predict a future location of the HMD 405. The tracking module 460 provides the estimated or predicted future position of the HMD 405 or the I/O interface 415 to the engine 455.

The engine 465 generates a 3D mapping of the area surrounding some or all of the HMD 405 (i.e., the "local area") based on information received from the HMD 405. In some embodiments, the engine 465 determines depth information for the 3D mapping of the local area based on information received from the HMD 405 that is relevant for techniques used in computing depth. The engine 465 may calculate depth information using one or more techniques in computing depth from structured light. In various embodiments, the engine 465 uses the depth information to, e.g., update a model of the local area, and generate content based in part on the updated model.

The engine 465 also executes applications within the HMD system 400 and receives position information, acceleration information, velocity information, predicted future positions, or some combination thereof, of the HMD 405 from the tracking module 460. Based on the received information, the engine 465 determines content to provide to the HMD 405 for presentation to the user. For example, if the received information indicates that the user has looked to the left, the engine 465 generates content for the HMD 405 that mirrors the user's movement in a virtual environment or in an environment augmenting the local area with additional content. Additionally, the engine 465 performs an action within an application executing on the console 410 in response to an action request received from the I/O interface 415 and provides feedback to the user that the action was performed. The provided feedback may be visual or audible feedback via the HMD 405 or haptic feedback via the I/O interface 415.

In some embodiments, based on the eye tracking information (e.g., orientation of the user's eye) received from the eye tracking system 445, the engine 465 determines resolution of the content provided to the HMD 405 for presentation to the user on the display element 420. The engine 465 provides the content to the HMD 405 having a maximum pixel resolution on the display element 420 in a foveal region of the user's gaze, whereas the engine 465 provides a lower pixel resolution in other regions of the display element 420, thus achieving less power consumption at the HMD 405 and saving computing cycles of the console 410 without compromising a visual experience of the user. In some embodiments, the engine 465 can further use the eye tracking information to adjust where objects are displayed on the display element 420 to prevent vergence-accommodation conflict.

ADDITIONAL CONFIGURATION INFORMATION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A mounting assembly comprising:
a housing that encloses a lens; and
an element retainer including a first surface and a second surface, and the first surface is directly fixed to the lens via a first adhesive element, and the second surface is directly fixed to the housing via a second adhesive element, the first adhesive element and the second adhesive element being separate elements placed on opposing sides of the element retainer.

2. The mounting assembly of claim 1, wherein the first adhesive element is a pressure-sensitive adhesive element.

3. The mounting assembly of claim 1, wherein the second adhesive element is selected from the group consisting of a pressure-sensitive adhesive element and an optical component compatible adhesive.

4. The mounting assembly of claim 1, further comprising:
a display housing coupled to the housing and configured to hold a display element.

5. The mounting assembly of claim 4, wherein a position of the lens relative to the display element is adjustable.

6. The mounting assembly of claim 4, wherein the lens is aligned relative to the display element based on one or more features on the display element.

7. The mounting assembly of claim 1, wherein an adhesive force of the first adhesive element varies with a direction of a shear force.

8. The mounting assembly of claim 1, wherein the second adhesive element is cured using ultraviolet light.

9. The mounting assembly of claim 1, wherein the housing further encloses an optical assembly including the lens, and the element retainer is directly fixed to the optical assembly via the first adhesive element.

10. A head-mounted display (HMD) comprising:
a display element configured to emit image light;
a lens that directs the image light to an eye box of an eye; and
an element retainer coupled to the lens and to a housing of the HMD, wherein
the lens is directly fixed to the element retainer via a first adhesive element, and
the element retainer is directly fixed to the housing via a second adhesive element, the first adhesive element and the second adhesive element being separate elements placed on opposing sides of the element retainer.

11. The HMD of claim 10, wherein the first adhesive element is a pressure-sensitive adhesive element.

12. The HMD of claim 10, wherein the second adhesive element is selected from the group consisting of a pressure-sensitive adhesive element and an optical component compatible adhesive element.

13. The HMD of claim 10, further comprising:
a display housing coupled to the housing and configured to hold the display element.

14. The HMD of claim 10, wherein a position of the lens relative to the display element is adjustable.

15. The HMD of claim 10, wherein the lens is aligned relative to the display element based on one or more features on the display element.

16. The HMD of claim 10, wherein an adhesive force of the first adhesive element varies with a direction of a shear force.

17. The HMD of claim 10, wherein the second adhesive element is cured using ultraviolet light.

18. The HMD of claim 10, wherein the housing further encloses an optical assembly including the lens, and the element retainer is directly fixed to the optical assembly via the first adhesive element.

19. A method comprising:
directly fixing an element retainer to a housing of a head-mounted display via a first adhesive element; and
directly fixing a lens to the element retainer via a second adhesive element, the element retainer positioned between the housing and the lens, the first adhesive element and the second adhesive element being separate elements placed on opposing sides of the element retainer.

20. The method of claim 19, further comprising:
adjusting position of the lens relative to a display element via an actuator, the display element held by a display housing coupled to the housing.

* * * * *